United States Patent Office 2,887,496
Patented May 19, 1959

2,887,496

PRODUCTION OF ORGANIC ACIDS FROM ALDEHYDES

Amelio E. Montagna, South Charleston, and Everett R. Lashley, Charleston, W. Va., assignors to Union Carbide Corporation, a corporation of New York No Drawing. Application February 4, 1957
Serial No. 637,867

12 Claims. (Cl. 260—345.7)

This invention relates to chemical processes. More particularly it relates to an improvement in the oxidation of aldehydes in a strongly basic medium to produce the salts of carboxylic organic acids, from which salts these acids can then be obtained.

In copending application, Serial No. 440,243 by A. E. Montagna and L. V. McQuillen, and assigned to the same assignee as this application, there is disclosed and claimed an improved process for the oxidation of aldehydes. Their process comprises reacting together a mixture of an aldehyde, a strong alkali such as sodium hydroxide, and molecular oxygen, in an aqueous medium and in the presence of finely divided silver, and thereby producing an aqueous solution of the alkali salt of the carboxylic acid corresponding to the aldehyde. This solution can then be treated with an acid stronger than the acid being produced, such as sulfuric acid, in order to liberate the product acid from its salt. The free acid can then be separated and purified by appropriate methods. The molecular oxygen, according to their process, can be pure oxygen, as cylinder oxygen, or it can be oxygen diluted with nitrogen or other gases in air.

An essential feature of their process is the use of a silver catalyst, preferably finely divided silver. We have found that in commercial scale operation of this process the life of this catalyst is somewhat shorter than would be expected from smaller scale operation. Accordingly we have investigated this problem and have discovered that by the use of a particular inhibitor compound mixture of triethanolamine and the tetrasodium salt of ethylenediaminetetraacetic acid, the catalyst life can be greatly increased, as evidenced by a much higher yield of product per pound of catalyst employed when the inhibitor has been added. We are uncertain of the exact manner in which the inhibitor functions and do not wish to be found by any particular theory in this regard. It appears, however, that the inhibitor compound in some manner protects the silver catalyst from attack by minor impurities inevitably encountered in commercial scale production.

The addition of the inhibitor compound mixture according to our invention can be made in any of the embodiments of the invention taught in the above-identified application of Montagna and McQuillen. Thus our inhibitor can be employed in aldehyde oxidation processes to make both saturated and unsaturated aliphatic acids. The unsaturated acids include sorbic, acrylic, methacrylic, crotonic, 2-ethyl-2-butenoic, 2-hexenoic, 2-methyl-2-pentenoic, 2-octenoic, 2-ethyl-2-hexenoic, 2,4,6-octatrienoic, and 4-pentenoic acids, and the saturated acids include butyric, n-hexanoic, 2-ethylbutyric, 2-ethylhexanoic, 2-ethyloctanoic and 2-butylhexanoic acids. Our inhibitor can also be used in the production of hydroxy and alkoxy acids, including 3-butoxybutyric, 3,5-diethoxyhexanoic and 2-ethyl-3-hydroxyhexanoic acids as well as dibasic acids such as glutaric, 3-methylglutaric, 2-ethyl-3-methylglutaric, and 2-ethylglutaric acids. Also it can be employed in making cyclic unsaturated acids, including Δ-3-tetrahydrobenzoic, Δ-3-tetrahydro-o-toluic, 2,3-dihydro-1, 4-pyran-2-carboxylic, 2,5-dimethyl-2,3-dihydro-1, 4-pyran-2-carboxylic and furoic acids. The production of aromatic acids such as benzoic, salicylic, cinnamic and p-chlorobenzoic acids is also greatly aided by the presence of our inhibitor.

The inhibitor compound which we have found effective in prolonging silver catalyst life in the oxidation of aldehydes is a mixture of triethanolamine and the tetrasodium salt of ethylenediaminetetraacetic acid. While it is essential that both components be present, their relative proportions are not extremely critical. In general we have found that the ratio may be between 0.25 and 4 parts by weight of triethanolamine to one part by weight of the tetrasodium salt of ethylenediaminetetraacetic acid. Our most preferred ratio is about two parts by weight of triethanolamine to one part by weight of ethylenediaminetetraacetic acid.

The proportion of inhibitor compound mixture added to the oxidation reaction mixture is not extremely critical. For good results, a minimum of 0.01 part by weight of inhibitor compound mixture for each one hundred parts by weight of silver catalyst should be employed. With more than 10 parts by weight of inhibitor per 100 parts by weight of silver catalyst, no greater advantage was noted. Our preferred range is from 0.1 to 2.0 parts be weight of inhibitor compound per 100 parts by weight of silver catalyst.

Table I below illustrates the high yield per pound of catalyst obtained when the inhibitor compound is added to the reaction according to our invention. Table II illustrates control runs made without the inhibitor compound of our invention and the much poorer yields of product per pound of catalyst thus obtained can be seen therein. The yield of product per pound of catalyst consumed in a particular run is an accurate measure of catalyst life.

Both Tables I and II were complied with information obtained in the following manner. The reactor employed consisted of a stainless steel autoclave designed for continuous operation at superatmospheric pressure. The reactor was equipped with a motor-driven turbine-type stirrer, an inlet for oxidizing gas at the bottom and automatic controls for regulating temperature, pressure, gas flow and liquid level. A filter in the reaction zone was connected to a product outlet and means was provided for blowing off excess gas.

In all runs in both Tables I and II the reactor was first charged with an aqueous suspension of silver catalyst which consisted of 5.5 parts by weight of silver and 94.5 parts of water. This catalyst had been prepared by dissolving silver nitrate in deionized water, feeding this solution into aqueous caustic soda and reducing the product silver oxide to silver with hydrogen peroxide. The stirrer was then started and compressed air was added until the pressure in the reaction reached 75 pounds per square inch gauge. Sufficient air was added to maintain this pressure for the duration of all oxidation runs. The air flow rate was adjusted as needed to allow a 200 percent stoichiometric excess of air, above that required for the oxidation, to leave the reactor.

The temperature in the reaction mixture was maintained at the values indicated in the tables for the various runs. The aldehyde being oxidized was added continuously at the rates indicated in the tables. Fifty percent aqueous sodium hydroxide was added simultaneously with the aldehyde so as to give a free alkalinity in the reaction mixture and product of the values shown in the tables. Sufficient deionized water was added continuously so as to give a product containing about 20 pounds of acid salt product per 100 pounds of aqueous product solution, the specific proportions for particular runs being shown in the tables. During the entire reaction periods of all runs the reaction mixture was agitated vigorously and a constant level was maintained in the reactor at all times through control of the rate at which the product was withdrawn. Runs 4 and 5 were terminated when a significant concentration of unoxidized hexadienal was detected in the product, indicating deactivation of the catalyst. Run 1 was terminated due to mechanical difficulties and Runs 2 and 3 because of exhaustion of the hexadienal available, all three being ended before deactivation of the catalyst.

In Runs 1, 2 and 3 of Table I, there was added to the reaction vessel an inhibitor mixture consisting of 63.2 parts by weight of triethanolamine and 36.8 parts by weight of the tetrasodium salt of ethylenediaminetetraacetic acid, the inhibitor mixture being added in the ratio of 0.5 part by weight of inhibitor mixture per 100 parts by weight of silver catalyst.

The yield of acid salt product in pounds per pound of silver catalyst is shown in both tables.

*Table I*

| Product | Run No. | Temp., °C | Aldehyde Feed Rate [1] | Free Alkalinity [2] | Product Concentration [3] | Pounds of Salt Product per Pound of Catalyst |
|---|---|---|---|---|---|---|
| Sodium 2-Ethylbutyrate | 1 | 57 | 0.40 | 0.4-0.7 | 21-23 | 165.0 |
| Sodium Sorbate | 2 | 55 | 0.36 | 0.6-0.8 | 20-21 | 624.0 |
| Do | 3 | 55 | 0.36 | 0.6-0.8 | 20-21 | 812.0 |

[1] In pounds per hour per gallon of operating volume.
[2] In pounds of NaOH per 100 pounds of product solution.
[3] In pounds of salt product per 100 pounds of product solution.

*Table II*

| Product | Run No. | Temp., °C | Aldehyde Feed Rate [1] | Free Alkalinity [2] | Product Concentration [3] | Pounds of Salt Product per Pound of Catalyst |
|---|---|---|---|---|---|---|
| Sodium 2-Ethylbutyrate | 4 | 56 | 0.37 | 0.5-0.6 | 20-22 | 62.5 |
| Sodium Sorbate | 5 | 55 | 0.36 | 0.6-0.8 | 21-21 | 84.4 |

[1] In pounds per hour per gallon of operating volume.
[2] In pounds of NaOH per 100 pounds of product solution.
[3] In pounds of salt product per 100 pounds of product solution.

What is claimed is:

1. In a process for oxidizing an aldehyde which includes the step of passing molecular oxygen through a strongly alkaline aqueous mixture of said aldehyde, in the presence of a silver catalyst to produce an alkaline salt of the acid corresponding to said aldehyde, the improvement which comprises increasing the active life of said catalyst in said process by conducting said step in the presence of, per 100 parts by weight of said silver catalyst, at least 0.01 part by weight of a mixture of triethanolamine and the tetrasodium salt of ethylenediaminetetraacetic acid.

2. In a process for the production of an organic acid, which includes the step of oxidizing an organic aldehyde by passing molecular oxygen through a strongly alkaline aqueous mixture of said aldehyde to an alkaline salt of said acid, in the presence of a silver catalyst, the improvement which comprises increasing the active life of said catalyst in said process by conducting said step in the presence of, per 100 parts by weight of said silver catalyst, at least 0.01 part by weight of a mixture of triethanolamine and the tetrasodium salt of ethylenediaminetetraacetic acid.

3. In a process for the production of a saturated aliphatic acid which includes the step of oxidizing the corresponding aldehyde to an alkaline salt of said acid by passing molecular oxygen through a strongly alkaline aqueous mixture of said aldehyde, in the presence of a silver catalyst, the improvement which comprises increasing the active life of said catalyst in said process by conducting said step in the presence of, per 100 parts by weight of said silver catalyst, at least 0.01 part by weight of a mixture of triethanolamine and the tetrasodium salt of ethylenediaminetetraacetic acid.

4. In a process for the production of an unsaturated aliphatic acid which includes the step of oxidizing the corresponding aldehyde to an alkaline salt of said acid by passing molecular oxygen through a strongly alkaline aqueous mixture of said aldehyde, in the presence of a silver catalyst, the improvement which comprises increasing the active life of said catalyst in said process by conducting said step in the presence of, per 100 parts by weight of said silver catalyst, at least 0.01 part by weight of a mixture of triethanolamine and the tetrasodium salt of ethylenediaminetetraacetic acid.

5. In a process for the production of an aliphatic dicarboxylic acid which includes the step of oxidizing the corresponding aldehyde to an alkaline salt of said acid by passing molecular oxygen through a strongly alkaline aqueous mixture of said aldehyde, in the presence of a silver catalyst, the improvement which comprises increasing the active life of said catalyst in said process by conducting said step in the presence of, per 100 parts by weight of said silver catalyst, at least 0.01 part by weight of a mixture of triethanolamine and the tetrasodium salt of ethylenediaminetetraacetic acid.

6. In a process for the production of a cycloaliphatic acid which includes the step of oxidizing the corresponding aldehyde to an alkaline salt of said acid by passing molecular oxygen through a strongly alkaline aqueous mixture of said aldehyde, in the presence of a silver catalyst, the improvement which comprises increasing the active life of said catalyst in said process by conducting said step in the presence of, per 100 parts by weight of said silver catalyst, at least 0.01 part by weight of a mixture of triethanolamine and the tetrasodium salt of ethylene-diaminetetraacetic acid.

7. In a process for the production of an aromatic acid which includes the step of oxidizing the corresponding aldehyde to an alkaline salt of said acid by passing molecular oxygen through a strongly alkaline aqueous mixture of said aldehyde, in the presence of a silver catalyst, the improvement which comprises increasing the active life of said catalyst in said process by conducting said step in the presence of, per 100 parts by weight of said silver catalyst, at least 0.01 part by weight of a mixture of triethanolamine and the tetrasodium salt of ethlenediaminetetraacetic acid.

8. In a process for producing sorbic acid, which includes the step of oxidizing 2,4-hexadienal to an alkaline sorbate by passing molecular oxygen through a strongly alkaline aqueous mixture of 2,4-hexadienal, in the presence of a silver catalyst, the improvement which comprises increasing the active life of said catalyst in said process by conducting said step in the presence of, per 100 parts by weight of said silver catalyst, at least 0.01 part by weight of a mixture of triethanolamine and the tetrasodium salt of ethylenediaminetetraacetic acid.

9. In a process for producing glutaric acid, which includes the step of oxidizing glutaraldehyde to an alkaline glutarate by passing molecular oxygen through a strongly alkaline aqueous mixture of glutaraldehyde, in the presence of a silver catalyst, the improvement which comprises increasing the active life of said catalyst in said process by conducting said step in the presence of, per 100 parts by weight of said silver catalyst, at least 0.01 part by weight of a mixture of triethanolamine and the tetrasodium salt of ethylenediaminetetraacetic acid.

10. In a process for producing 2-ethylbutyric acid, which includes the step of oxidizing 2-ethylbutyraldehyde to an alkaline salt of said acid by passing molecular oxygen through a strongly alkaline aqueous mixture of 2-ethylbutyraldehyde, in the presence of a silver catalyst, the improvement which comprises increasing the active life of said catalyst in said process by conducting said step in the presence of, per 100 parts by weight of said silver catalyst, at least 0.01 part by weight of a mixture of triethanolamine and the tetrasodium salt of ethylenediaminetetraacetic acid.

11. In a process for producing acrylic acid, which includes the step of oxidizing acrolein to an alkaline acrylate by passing molecular oxygen through a strongly alkaline aqueous mixture of acrolein, in the presence of a silver catalyst, the improvement which comprises increasing the active life of said catalyst in said process by conducting said step in the presence of, per 100 parts by weight of said silver catalyst, at least 0.01 part by weight of a mixture of triethanolamine and the tetrasodium salt of ethylenediaminetetraacetic acid.

12. In a process for producing 2,3-dihydro-1,4-pyran-2-carboxylic acid, which includes the step of oxidizing acrolein dimer to an alkaline salt of said acid by passing molecular oxygen through a strongly alkaline aqueous mixture of acrolein dimer, in the presence of a silver catalyst, the improvement which comprises increasing the active life of said catalyst in said process by conducting said step in the presence of, per 100 parts by weight of said silver catalyst, at least 0.01 part by weight of a mixture of triethanolamine and the tetrasodium salt of ethylenediaminetetraacetic acid.

References Cited in the file of this patent

UNITED STATES PATENTS

| | | |
|---|---|---|
| 2,041,184 | Isenhour | May 19, 1936 |
| 2,288,566 | Herstein | June 30, 1942 |
| 2,407,066 | Dunlop | Sept. 3, 1946 |
| 2,419,158 | Pearl | Apr. 15, 1947 |
| 2,446,606 | Pearl | Aug. 10, 1948 |
| 2,514,156 | Bradford et al. | July 4, 1950 |

FOREIGN PATENTS

| | | |
|---|---|---|
| 118,461 | Sweden | Apr. 1, 1947 |